United States Patent [19]
Rohatgi

[11] Patent Number: 5,897,943
[45] Date of Patent: *Apr. 27, 1999

[54] METAL MATRIX COMPOSITE INCLUDING HOMOGENEOUSLY DISTRIBUTED FLY ASH, BINDER, AND METAL

[75] Inventor: Pradeep K. Rohatgi, Milwaukee, Wis.

[73] Assignee: Electric Power Research Institute, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/787,975

[22] Filed: Jan. 23, 1997

Related U.S. Application Data

[62] Division of application No. 08/564,517, Nov. 29, 1995, Pat. No. 5,711,362.

[51] Int. Cl.$^6$ ............................. B32B 5/00; B32B 15/04; B32B 17/02; B32B 18/00
[52] U.S. Cl. ..................................... 428/307.3; 428/307.7; 428/312.2; 428/317.1; 428/317.7; 428/317.9; 428/325; 428/457; 428/539.5; 428/542.8; 106/638; 106/672; 106/679; 106/690; 106/691; 106/705; 106/707; 106/405; 106/DIG. 1; 164/91; 164/97
[58] Field of Search ............................. 164/97, 102, 103, 164/114, 91, 98; 148/538, 437, 549, 514, 522, 523, 525; 428/457, 307.7, 307.3, 317.1, 312.2, 317.7, 317.9, 325, 539.5, 542.8; 260/42.53, 31.2, 53; 106/638, 672, 679, 690, 691, 705, 707, 405, DIG. 1

[56] References Cited

U.S. PATENT DOCUMENTS

| | | | |
|---|---|---|---|
| 4,659,610 | 4/1987 | George et al. | 428/198 |
| 4,741,782 | 5/1988 | Styron | 106/309 |
| 5,228,494 | 7/1993 | Rohatgi | 164/97 |
| 5,626,692 | 5/1997 | Rohatgi et al. | 148/538 |

*Primary Examiner*—Vivian Chen
*Attorney, Agent, or Firm*—Flehr Hohbach Test Albritton & Herbert LLP

[57] ABSTRACT

Metal matrix composites comprising of a solid preform comprising of a filler phase containing fly ash and a binding material having a binder to water ratio of 1:1 to 1:9, wherein the preform contains a metal homogeneously distributed within the preform.

9 Claims, No Drawings

METAL MATRIX COMPOSITE INCLUDING HOMOGENEOUSLY DISTRIBUTED FLY ASH, BINDER, AND METAL

This application is a divisional of application Ser. No. 08/564,517, filed Nov. 29, 1995, U.S. Pat. No. 5,711,362.

FIELD OF THE INVENTION

The field of this invention is metal matrix composites.

BACKGROUND

Metal matrix composites are materials which comprise a secondary, reinforcing or filler phase in combination with a metal matrix. Metal matrix composites have different, and often improved or more desirable, properties as compared to their monolithic metal counterparts. For example, depending on the particular metal and reinforcing phases present in a composite material, as well as their respective ratios in the composite material, the composite material may have improved characteristics with respect to strength, stiffness, contact wear resistance and elevated temperature strength, as compared to the corresponding monolithic metal. Furthermore, depending on the choice of reinforcing phase present in the composite, the metal matrix materials may be less expensive to prepare than their monolithic metal counterparts.

There are many potential applications for metal matrix composites. Significant applications of metal matrix composites are likely in automotive components, machine parts, and electronic packaging, as well as in specialized products based on unique combinations of properties.

Of particular interest are metal matrix composites comprising fly ash, because such composites are less expensive to prepare and exhibit improved properties with respect to their corresponding monolithic metal counterparts. Fly ash is an abundant by-product that results from the combustion of pulverized coal. In the past fly ash has been employed as a concrete admixture, as a soil stabilizer, as a filler for asphalt and structural materials, such as bricks. Fly ash comprises micron sized, translucent spherical particles which consist primarily of alumina, silica, iron oxides, lime and manganese.

A variety of methods for producing metal matrix composite materials have been developed. These methods include diffusion bonding, powder metallurgy, casting, pressure infiltration of loose fly ash beds, spray codisposition and the like. For fly ash metal matrix composites in particular, stir casting and pressure infiltration of loose fly ash beds have found use.

Although a variety of methods for metal matrix composite material production have been developed, these methods are not entirely satisfactory. For example, problems with uneven distribution of the reinforcing phase in the metal matrix, inadequate levels of the reinforcing phase in the matrix, and lack of control over the amount of the reinforcing phase which is incorporated into the matrix, are known to occur. These problems are particularly prevalent in the production of fly ash metal matrix composites, where compositions with homogeneously distributed fly ash levels of 30% or higher have not heretofore been produced.

Thus, there is continued interest in the development of new methods of producing metal matrix composites. Of particular interest is the development of metal matrix composites comprising fly ash, wherein the fly ash levels exceed 30% of the composite and the fly ash is evenly distributed throughout the composite.

Relevant Literature

U.S. Pat. No. 5,226,494 reports a method of preparing a metal matrix composite material where the reinforcing phases, such as fly ash and oil ash, are added to molten metal and stirred at high speed. U.S. Pat. No. 5,020,584 reports a method of making metal matrix composite materials where molten metal infiltrates a preform of filler material, where an infiltration enhancer material is employed. Other U.S. Patents of interest include U.S. Pat. Nos. 3,573,940; 3,585,155; 4,601,832; 4,888, 054 and 4,936,270.

SUMMARY OF THE INVENTION

Novel metal matrix composites, as well as methods for their production, are provided. The subject method comprises combining a reinforcing phase with an aqueous medium comprising a binder to produce a slurry that is dried to produce a solid, porous preform. The resultant solid, porous preform is then infiltrated with a molten metal to produce the subject metal matrix composite.

DESCRIPTION OF THE SPECIFIC EMBODIMENTS

Metal matrix composites and methods for their production are provided. In the subject methods, a reinforcing phase is combined with an aqueous medium comprising a binder to produce a slurry which is dried to produce a solid, porous preform of the reinforcing phase. The resultant preform is then infiltrated with a molten metal to produce a metal matrix composite. In further describing the invention, the subject methods will first be developed in greater detail followed by a discussion of the metal matrix composites produced by the subject methods.

In the subject methods, the first step is to prepare a solid, porous, reinforcing phase preform of the reinforcing phase. The reinforcing or filler phase may be any material which can be advantageously incorporated into a metals matrix. A variety of reinforcing phases have found use in metal matrix composites, such as oil ash, glass, graphite or carbon, superconducting ceramics, and the like. Of particular interest as a reinforcing phase because of its low cost and the physical properties imparted by it to the composite material is fly ash. Where fly ash is employed as the reinforcing phase, the fly ash may be "C-" or "F-type" fly ash, with "F-type" fly ash being preferred. The filler material may be present in a variety of forms, such as fibers, whiskers, spheres, particles and the like, preferably spheres and particles, e.g. fly ash cenospheres and precipitator fly ash.

In preparing the solid, porous, reinforcing phase preform, the reinforcing phase is combined with an aqueous medium comprising a binder. Binders which find use in the subject methods are those which are capable of holding the reinforcing material particles together in a preform and providing the requisite strength to the preform so that it retains its shape during the metal infiltration step, described below. The binder employed in the subject method, or derivative thereof produced during the subject process, should not adversely affect the properties of the composite. Binders that find use in the subject process include inorganic and organic binders. Specific inorganic binders of interest are sodium silicate and monoaluminum phosphate, with monoaluminum phosphate being preferred. Specific organic binders of interest include polymers, such as polyvinyl alcohol, and the like.

The amount of binder which is present in the aqueous medium and thereby used in the preform fabrication step is critical, since an excess of binder will result in a preform of low porosity which inhibits adequate infiltration of the molten metal. Conversely, a deficiency of binder in the aqueous medium will result in preform of inadequate strength. Although the amount of binder present in the aqueous medium which is combined with the reinforcing material will necessarily depend on the particular binder employed, the ratio of binder to water in the aqueous medium will generally range from 1:1 to 1:9, usually 1:1 to 1:7 and more usually 1:1 to 1:2.

The amount of reinforcing phase that is combined with the aqueous medium comprising the binder will be sufficient to form a slurry which is pourable and capable of being dried into a solid, porous preform. Usually the ratio of reinforcing phase to aqueous medium will range from about 1:1 to 3:1, usually from about 1.5:1 to 2:1. The reinforcing material and aqueous medium will be combined under conditions which result in a uniform dispersion of the reinforcing material in the aqueous medium, usually under conditions of mild agitation.

Optionally, the slurry produced by combination of the aqueous medium comprising the binder and the reinforcing phase may further comprise a porosity modifying agent. Porosity modifying agents may be included where higher porosity in the preform is desired, e.g. for composites with a greater metal content. Suitable porosity modifying agents will be agents which are removed during subsequent processing of the preforms, thereby increasing the void volume or porosity of the preform, and include carbon powder, wood flour, polymer powder, and the like.

The next step in fabrication of the solid, porous preform is to dry the slurry. To prepare a preform with a conveniently workable shape, the slurry may be introduced into a mold, where the manner of introduction is not critical to the invention, and then dried to produce a molded preform. Any convenient mold shape may be employed, such as cylindrical, square, rectangular and the like, with the particular mold shape being chosen as a matter of convenience, depending on the desired use of the composite material produced from the preform. The mold will be fabricated from any convenient material which is capable of withstanding the elevated temperatures used in drying, where such materials are known to those of skill in the art.

Following introduction into the mold, the slurry is then dried to produce a porous, reinforcing material preform. To enhance the rate of drying, the slurry may be dried at elevated temperatures for a period of time sufficient to produce a solid, porous structure. Generally, the slurry will be dried at temperatures ranging from about 90 to 250° C., usually from about 110 to 230° C., and more usually ranging from about 150 to 210° C. Where elevated temperatures are employed, the slurry will be dried for a period ranging from about 1 to 5 hours, usually 1 to 2 hours.

After the slurry has been dried to produce a solid, porous preform, it is removed from the mold and further dried to remove substantially all of the water remaining in the preform. By substantially all of water is meant that at least about 90%, usually at least about 95% and preferably at least about 98% of the water present in the preform following separation of the preform from the mold is removed. This additional drying step may occur at temperatures ranging from about 200 to 800° C., usually from about 350 to 750° C., and more usually 550 to 650° C., over period of time ranging from 10 to 50 hours, usually 12 to 48 hours, more usually 24 to 48 hours.

The next step in preparing the subject metal matrix composites is the molten metal infiltration step in which the preform is combined with molten metal to produce the metal matrix composite. In this step, the porous preform is infiltrated with the molten metal component of the metal matrix composite. A variety of metals and metal alloys may be infiltrated into the preform to produce the subject composites, including aluminum, copper, zinc, magnesium, iron, lead, tin and the like, as well as alloys thereof. The metal or metal alloy will be in a molten or liquid phase and will usually be at a temperature ranging from about 300 to 1200° C., more usually 350 to 1000° C.

The molten metal will be infiltrated into the porous preform of reinforcing material by contacting the metal with the preform, whereby the molten metal is introduced into the porous preform. To assist in infiltration of the metal into the porous preform, pressure may be employed. Pressures will generally range from about 100 to 5000 psi, usually from about 2000 to 2500 psi. Although the amount of metal which is infiltrated into the preform reinforcing material will necessarily depend on the volume and porosity of the preform, the amount which is infiltrated will be sufficient to substantially fill the porous or void volume in the preform. By substantially filling is meant that at least about 90%, usually at least 95% and preferably at least about 97% of the void volume of the porous preform becomes occupied with the molten metal during the infiltration step.

Depending on the desired nature of the metal matrix composite, infiltration of the molten metal or metal alloy into the preform may occur in a mold cavity in which the preform occupies substantially all of the cavity space, so that the resultant metal matrix composite is a homogeneous structure. Alternatively, where one desires regions of monolithic metal or metal alloy in the composite, e.g. where a monolithic metal or metal alloy surface is desired for the resultant composite, during contact the preform may occupy only a region of the entire mold cavity.

Following infiltration, the resultant metal matrix composite may be cooled, where cooling may be accomplished using any convenient means, including air drying, forced air and low temperatures and the like. The rate at which the resultant composite is cooled should not be so rapid as to result in cracking of the composite. The optimal rate can be readily determined empirically. The resultant metal matrix composite may be further processed as desired, e.g. the composite may be machined, sanded and the like. Optionally, the metal matrix composite may be dipped or immersed into molten metal to provide a metal matrix composite coated with a layer of monolithic metal or metal alloy.

The resultant metal matrix composites will comprise the reinforcing phase of the preform, the binder and the metal phase or matrix. As used with reference to the subject composites, the term binder includes any derivatives thereof which may be produced during the manufacture of the composite, e.g. at temperatures above 230° C., monoaluminum phosphate will convert to aluminum triphosphate. The composites will be characterized by having a uniform dispersion of reinforcing phase distributed throughout the metal phase matrix, at least in the region of the composite comprising the reinforcing phase, since some composites may be fabricated to comprise regions of monolithic metal devoid of reinforcing phase. In this latter case, the metal matrix composite will comprise a first region of homogeneously distributed reinforcing phase and a second region of monolithic metal or alloy thereof. By uniform is meant that in the region of the composite comprising the reinforcing phase, the reinforcing phase is not at a higher proportion in one portion of the region as compared to another portion of the composite. In other words, the reinforcing phase is homogeneously distributed throughout the region of the metal matrix comprising the reinforcing phase. The percentage of reinforcing phase in the composite will generally range from about 30 to 70%, usually from 50 to 60%. For composites comprising fly ash, the reinforcing phase may be present in excess of 50% and may be present up to 70%, usually up to about 60%.

The subject composites may find use in a variety of applications, such as their use as structural materials, where the properties of the metal matrix composite are more desirable than the properties of the corresponding monolithic metal.

The following examples are offered by way of illustration and not by way of limitation.

EXPERIMENTAL

EXAMPLE 1
Preparation of Fly ash Preforms

Fly ash preforms were prepared from both cenosphere fly ash (density <1) and precipitator fly ash (density >1) by combining known volumes of fly ash with a sufficient volume of a monoaluminum phosphate solution (MAP solution) to produce a pourable slurry. The slurry was then poured into a cylindrical or rectangular shaped cavity where it was dried at 180° F. for 2 h, ejected from the mold, and then cured outside the mold at 400° F. for 24 or 48 h. Table 1 below provides the ratio of fly ash to MAP solution used to produce the slurries, as well as the preform density characteristics for several cenosphere fly ash preforms produced according to the above process.

TABLE 1

| Preform No. | MAP solution (MAP:Water) | Ratio of Fly ash to MAP solution in Slurry | Curing Time at 1500° F. (hr) | Preform Density g/cc |
|---|---|---|---|---|
| 1 | 1:0 | 2:1 | 24 | 0.68 |
| 2 | 1:1 | 2:1 | 24 | 0.64 |
| 3 | 1:2 | 2:1 | 24 | 0.62 |
| 4 | 1:3 | 2:1 | 24 | 0.58 |
| 5 | 1:5 | 2:1 | 24 | 0.61 |
| 6 | 1:7 | 2:1 | 48 | 0.55 |
| 7 | 1:8.6 | 2:1 | 48 | 0.51 |

EXAMPLE 2
Preparation of Aluminum-Fly ash Metal Matrix Composites from Fly ash Preforms Prepared in Example 1.

Using the fly ash preforms prepared in Example 1, aluminum-fly ash composites were prepared using the squeeze casting or pressure infiltration technique described below. The fly ash preforms of sizes 1¾ in (44 mm) and 2 in (51 mm) diameter were placed in a 2 in (51 mm) graphite die and pre-heated at 1500° F. for 2 hr. Molten aluminum alloy (A356) was poured into the die at 1550° F. A pressure of 2000 psi (13.8 MPA) –2500 psi (17.2 MPA) was applied on top of the molten aluminum and maintained for 10 min. The composite was allowed to cool in the die.

The cooled composite was ejected from the die and the bulk density and hardness of the composites were measured.

The fly ash in the resultant aluminum-fly ash composites was evenly distributed throughout the composite. In composites prepared from precipitator ash, the percentage of fly ash in the composites was 60%.

EXAMPLE 3
Preparation of Lead-Fly Ash Composites

Cenosphere fly ash preform of size ⅜" φ and 4" long were prepared. A steel mold size 1' outer diameter and ½' internal diameter was coated inside with boron nitride and dried in a oven at 210° F. for 2 hours. The steel mold which contained the fly ash preform was heated to 500° C. in a resistance furnace. Molten lead at 400° C. was poured into the heated steel mold and an external pressure of 1200 psi was applied for 1 minute. The pressure was released and the sample was ejected.

Table 2 compares the hardness characteristics of pure lead and the resultant lead-fly ash composite. Due to the incorporation of fly ash into lead, the hardness of the material significantly increases.

TABLE 2

Hardness of lead and lead - fly ash composite (HB)

| Pure lead (gravity cast) | Pure lead (squeeze cast) | Lead - fly ash sample #1 | Lead - fly ash sample #2 | Lead - fly ash sample #3 |
|---|---|---|---|---|
| 6.1 | 6.3 | 15.6 | 14.2 | 13.2 |

Pure lead is a very soft material. It is hard to measure impact strength for a soft material by Charpy test. With the addition of fly ash into lead, the hardness of the material is increased (as shown in Table 2).

An impact test was also carried out on the resultant lead-fly ash composite based on ASTM standard ( E 23-86). The impact energy of the lead-fly ash composite was found to be 1.96 J/cm$^2$. From an SEM picture of the fractured surface of a lead-30 vol % fly ash composite, it was noted that even though the hardness of the material increased due to addition of fly ash, the fractured surface still exhibited a ductile behavior.

Table 3 provides the density data for test bar of a lead-40% fly ash composite and pure lead. The density of the pure lead produced by squeeze casting is marginally higher than that produced by gravity casting. As a result of additions of cenosphere fly ash, the density of the composite significantly decreased from 11.3 g/cm$^3$ to 7.75 g/cm$^3$.

TABLE 3

Densities of lead and lead - fly ash composite, g/cm$^3$.

| Pure lead (gravity cast) | Pure lead (squeeze cast) | Lead - 30% fly ash Theoretical (1) | Lead - 40% fly ash |
|---|---|---|---|
| 11.26 | 11.27 | 9.69 | 7.75 |

Based on cenosphere density of 0.48 g/cc and lead density of 11.27 g/cc

From the above results it was concluded that the hardness of lead-fly ash composites is significantly higher than that of matrix lead. Hence the composite is expected to possess significantly higher creep resistance. It was also observed that a lead-40 vol % cenosphere fly ash composite showed substantial charpy impact strength. Finally, it was observed that the density of lead-40 vol % fly ash composite was 7.75 g/cm$^3$.

Extended corrosion tests were conducted for a period of 470 days for a lead -fly ash composite to determine the applicability of such composites for use in batteries. The lead-fly ash specimens tested were 13 mm diameter rods which were immersed in the electrolyte to a depth of 7.5 mm. Anode specimens were immersed in 5M sulphuric acid and subjected to electrical potentials controlled to simulate the condition of a lead-acid battery anode under stand-by conditions. All specimens were subjected to the same constant applied potential. All measurements were performed at ambient room temperature (20° C.). Current readings for each cell were taken every 24 hours.

The measured current densities of several lead samples and lead-fly ash composites up to 470 days were measured. As the testing time extended, the current densities in the cells with fly ash composites were closer to that of the pure lead cell. From this observation, it was concluded that while there may be a little higher corrosion current in the fly ash composites in the initial stages due to acid exposure of some surface fly ash particles, over time the corrosion current decreased. In long term exposure, the anodic corrosion behavior of lead fly ash composites at room temperature was observed to be at least equal to, if not better than, pure lead samples, making such composites potentially suitable for use in lead-lite batteries.

It is evident from the above discussion and examples that novel methods for preparing metal matrix composites, as well as novel metal matrix composites, are provided. Though relatively uncomplicated, the subject methods provide for the production of metal matrix composites in which the percentage of reinforcing phase in the composite exceeds 30%. Furthermore, the reinforcing phase in the subject composites is evenly distributed throughout the composite. Because the subject methods employ reinforcing phase preforms, the percentage of reinforcing material and metal in the composite can be readily controlled, the distribution of the reinforcing phase throughout the matrix can be controlled, the strength of the composite can be enhanced, and the shape of the composite can be readily controlled through the shape of the preform.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A metal matrix composite comprising:
   a solid preform constructed from a filler phase comprising fly ash and a binding material with an original binder to water ratio ranging from 1:1 to 1:9; and
   a metal homogeneously distributed within said solid preform.

2. The composite according to claim 1, wherein said filler phase is present in said composite in excess of 50%.

3. The composite according to claim 1, wherein said metal is selected from the group consisting of aluminum, copper, zinc, magnesium, iron, lead, tin and alloys thereof.

4. The composite according to claim 1, wherein said composite comprises a first region of homogeneously distributed filler phase and a second region of monolithic metal.

5. The composite of claim 1 wherein said fly ash comprises precipitator fly ash.

6. The composite of claim 1 wherein said fly ash comprises cenosphere fly ash.

7. A metal matrix composite comprising:
   a solid preform constructed from fly ash and a binding material with an original monoaluminum phosphate to water ratio ranging from 1:1 to 1:9; and
   aluminum homogeneously distributed within said solid preform.

8. The composite according to claim 7, wherein said fly ash is cenosphere fly ash.

9. The composite according to claim 7, wherein said fly ash is preciptator fly ash.

* * * * *